United States Patent
Hones et al.

[11] Patent Number: 5,883,454
[45] Date of Patent: Mar. 16, 1999

[54] ELECTORMAGNETIC DRIVE METHOD AND APPARATUS FOR DRIVING A ROTATIONALLY STABILIZED MAGNETICALLY LEVITATED OBJECT

[75] Inventors: Edward W. Hones, Los Alamos, N. Mex.; William G. Hones, Seattle, Wash.

[73] Assignee: Creative Gifts, Inc., Seattle, Wash.

[21] Appl. No.: 803,027

[22] Filed: Feb. 19, 1997

Related U.S. Application Data

[63] Continuation-in-part of Ser. No. 672,672, Jun. 28, 1996, abandoned.

[51] Int. Cl.$^6$ .............................. H02K 7/09; H01F 7/02
[52] U.S. Cl. .................. 310/90.5; 40/426; 74/5.7; 335/229; 335/306; 446/129; 446/131
[58] Field of Search .................. 310/90.5; 40/426; 446/131, 132, 133, 129; 74/5.46, 5.7; 335/302–306, 229; 104/283; 33/316–330, 355 R

[56] References Cited

U.S. PATENT DOCUMENTS

| | | | |
|---|---|---|---|
| Re. 7,455 | 1/1877 | Fesca | 74/573 R |
| 2,691,306 | 10/1954 | Beams et al. | 74/5.46 |
| 4,382,245 | 5/1983 | Harrigan | 335/306 |
| 4,427,960 | 1/1984 | Wuerfel | 335/285 |
| 5,019,738 | 5/1991 | Weilback et al. | 310/90.5 |
| 5,168,183 | 12/1992 | Whitehead | 310/12 |
| 5,177,387 | 1/1993 | McMichael et al. | 310/90.5 |
| 5,213,703 | 5/1993 | Furuyama et al. | 252/62.54 |
| 5,321,986 | 6/1994 | Sears et al. | 74/5.46 |
| 5,396,136 | 3/1995 | Pelrine | 310/90.5 |
| 5,404,062 | 4/1995 | Hones et al. | 310/90.5 |
| 5,481,146 | 1/1996 | Davey | 310/90.5 |
| 5,506,459 | 4/1996 | Ritts | 310/90.5 |
| 5,535,582 | 7/1996 | Paweletz | 57/414 |

FOREIGN PATENT DOCUMENTS 1595792  7/1970  France .

OTHER PUBLICATIONS

Simon, Martin D. et al., "Stability of the Levitron magnetic levitator", APS/AAPT Meeting, May 1996.
Supplementary European Search Report for EP Application No. 95 90 7934 dated 20 Nov. 1995.

*Primary Examiner*—Nestor Ramirez
*Assistant Examiner*—Burton S. Mullins
*Attorney, Agent, or Firm*—Blank Rome Comisky & McCauley LLP

[57] ABSTRACT

An electromagnetic drive apparatus and method are operative to rotate a magnetically levitated object for an indefinite period of time. The object, such as a spinning magnetic top with a spindle, is levitated over a base magnet and a horizontal component of a pulsed magnetic field is applied at the region of the spinning magnetic top to maintain the top spinning and levitating indefinitely. The pulsed magnetic field is generated by applying a pulsed dc voltage or an ac current to a coil situated in proximity to the top. The coil may have a cylindrical or oblong shape and a core may be provided in the coil. Levitation stability and duration are improved by positioning a loosely fitting washer on the spindle of the spinning magnet so as to permit relative rotation therebetween during application of the pulsed magnetic field.

39 Claims, 2 Drawing Sheets

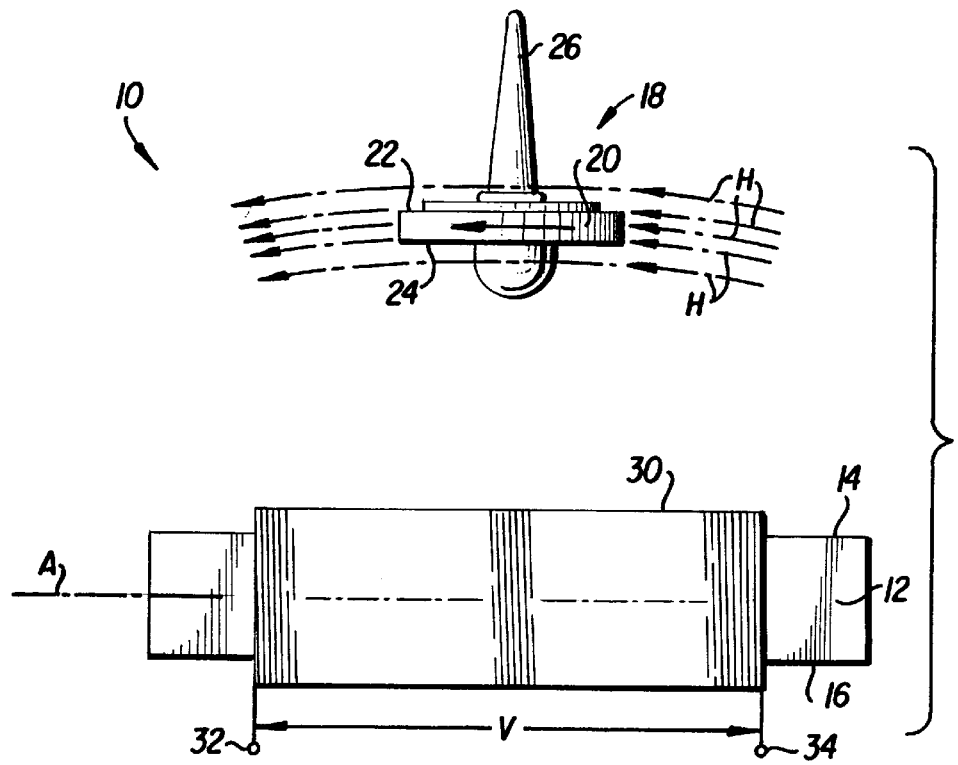
FIG. 1
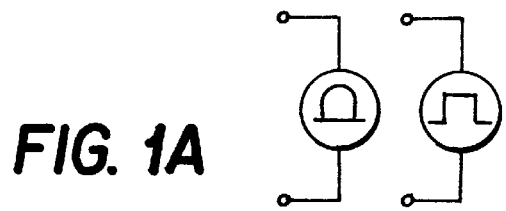
FIG. 1A
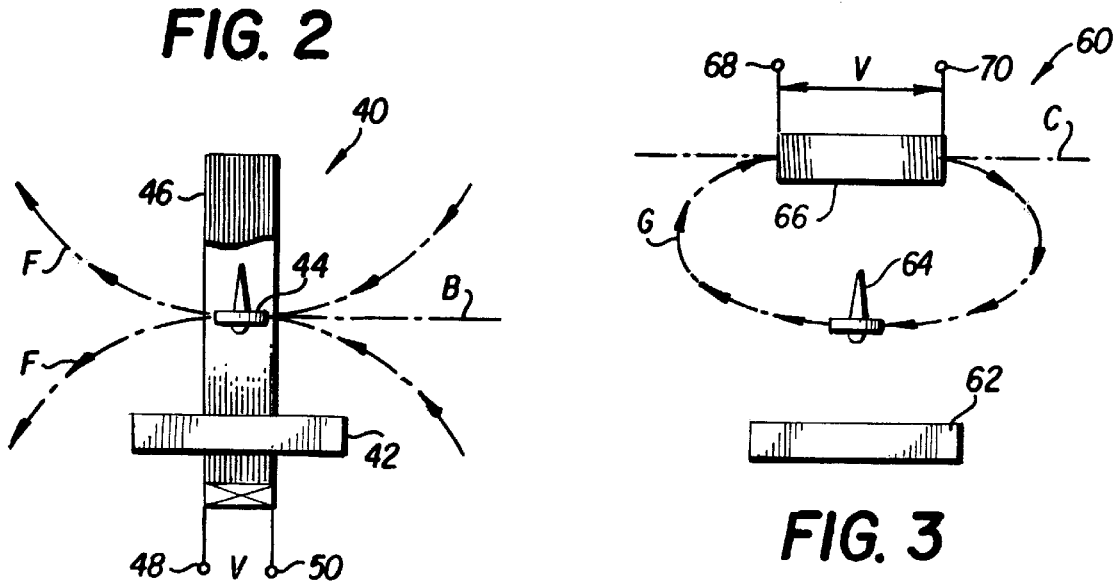
FIG. 2
FIG. 3

ELECTORMAGNETIC DRIVE METHOD AND APPARATUS FOR DRIVING A ROTATIONALLY STABILIZED MAGNETICALLY LEVITATED OBJECT

CROSS-REFERENCE TO RELATED APPLICATION

This application is a continuation-in-part of U.S. patent application Ser. No. 08/672,672 filed Jun. 28, 1996 now abandoned.

FIELD OF THE INVENTION

The present invention relates to rotationally stabilized, magnetically levitated devices and more particularly to a method of and an apparatus for electromagnetically maintaining the rotation and thus the stabilization and levitation of magnetically levitated devices indefinitely or for an extended period of time.

BACKGROUND OF THE INVENTION

Levitation of one magnet above another against the force of gravity can be accomplished by positioning the two magnets with the polarity of the upper (levitated) magnet opposite that of the lower (supporting) magnet so that the like poles (north or south) of the two magnets confront one another. Such nearly frictionless supporting of one magnetic body by another holds great potential for technological and commercial applications and great appeal for recreational and entertainment applications. Unfortunately, such juxtapositions of magnets are inherently unstable and usually must be mechanically constrained against lateral and flipping movement if the magnetic vertical lifting force is to be effective or useful. Nevertheless, special methods and apparatus have been developed for achieving magnetic levitation that do not require mechanical constraints.

One approach is to use electromagnets or combinations of permanent magnets and electromagnets with sophisticated automatic control systems that rapidly alter or modify the magnetic fields so as to prevent the lateral and flipping movements. This is one technique that is applied, for example, in magnetically levitated (maglev) trains and spinning rotor molecular drag vacuum gauges. Another method allows one permanent magnet to float (levitate) in the magnetic field of another permanent magnet without the use of any external controls, electrical circuits or mechanical constraints. U.S. Pat. No. 5,404,062 and U.S. patent application Ser. No. 08/413,949 filed Mar. 30, 1995 disclose such a levitation system. This system, now being produced and sold under the registered trademark, LEVITRON®, uses a flat lower magnet to magnetically support or levitate a smaller spinning magnet. The smaller magnet has an annular or ring shape with a non-magnetic spindle fitted into the central hole thereof, the combination thus resembling a toy top. The system is operated by first placing a sheet of nonmagnetic material such as a plastic sheet on the lower magnet. The top is pressed gently against the plastic sheet and is set spinning either manually or with a mechanical device. The plastic sheet, bearing the spinning top, is then manually lifted upwardly. When the top reaches a certain height above the lower magnet (usually about one to four inches), it rises off the plastic sheet and remains spinning stably in space, supported only by the force from the interacting magnetic fields of the two magnets. The top will continue to spin for several minutes, its rotational speed gradually decreasing due to air drag. When the speed falls below that required to maintain stability, the top flips over and falls to the lower magnet.

U.S. Pat. No. 4,382,245 to Harrigan discloses another simple magnetic levitation system which utilizes a dish-shaped lower magnet to magnetically support or levitate a magnetic top spinning coaxially above the lower magnet. The dish-shaped or concave surface of the lower magnet is said to produce radially inwardly directed lines of magnetization which, together with the gyroscopic effect of rotation of the magnetic top, provide stabilization of the levitation system. The Harrigan patent also discloses that the top may be rotated manually or by air jets or rotary or oscillating magnetic or electric fields.

In U.S. patent application Ser. No. 08/506,351 filed Jul. 24, 1995, the disclosure of which is incorporated herein by reference, there are disclosed a method of and an apparatus for extending the duration of levitation of a rotationally stabilized magnetic levitation device, such as that disclosed in U.S. Pat. No. 5,404,062 and the aforesaid U.S. patent application Ser. No. 08/413,949, from its normal duration of several minutes to durations of up to many hours, or essentially indefinitely. That is accomplished by a plurality of fluid streams, such as air, directed at the top, with a radial component and a component tangential to the periphery, of the spinning top. An annular manifold connected to the outlet of one or more small air pumps is used to maintain the top spinning. The manifold distributes the air to a number of slender tubes comprising a set of air jets. The manifold is supported in such a way that the jet outlets or nozzles are arrayed in a circle about the spinning top and in a horizontal plane at the levitating height of the top. The air nozzles are directed in the horizontal plane of the top and the air streams projected in this plane have both tangential and radial components relative to the periphery and spin axis of the top, respectively. The top periphery is preferably provided with reaction surfaces, such as vanes, protuberances, roughened surfaces or the like. Such surfaces react with the air streams coming from the air nozzles and transfer the linear momentum of the air streams to angular momentum of the top, thus maintaining the rotational velocity of the top against air drag.

In the aforesaid U.S. patent application Ser. No. 08/672, 672 of which this application is a continuation-in-part, another method of and an apparatus for extending the duration of levitation of a rotationally stabilized magnetic levitation device, such as the levitated spinning top disclosed in U.S. Pat. No. 5,404,062 and U.S. patent application Ser. No. 08/413,949, are disclosed. According to that invention, a flat base magnet is magnetized such that the field lines of its magnetic field are substantially perpendicular to the flat surfaces of the base magnet as described in U.S. Pat. No. 5,404,062 and U.S. patent application Ser. No. 08/413,949. The magnet of the spinning top is magnetized such that the field lines of its main magnetic field are substantially parallel to the spin axis of the spinning top. In that combination, when the top is spun manually about a vertical axis over the base magnet at a rotational speed or spin rate of about 18–35 cycles per second (cps) or about 1080–2100 rpm, the spinning top will be levitated above the base magnet for several minutes, e.g., 2–5 minutes. As used herein, the terms "vertical" and "horizontal" are determined with reference to the local vertical at the spin axis of the top.

According to the invention of the aforesaid application Ser. No. 08/672,672, it is possible to increase the duration of levitation of the spinning top by locating a horizontal component of a magnetic field in the region of the spinning top and pulsing that magnetic field between a minimum and a maximum value at a selected repetition rate. The pulse repetition rate of the field varies from a relatively low pulse rate, e.g., on the order of about 15 pulses per second (pps), to a higher pulse rate, e.g., on the order of about 30 pps. A square wave pulse or haversine wave pulse are both effective in maintaining the top spinning although other pulses including negative or positive or alternating pulses, clipped sine waves, etc., will work.

The pulsed magnetic field is achieved by locating one or more conductive wire coils in a position with respect to the magnet of the spinning top so that when a pulsed dc voltage is applied to the coil a pulsed horizontal field is generated at the spinning top. The pulsed magnetic field is applied before or after the top is spun either manually or by any other means. The spinning top is subjected to the horizontal component of the pulsed magnetic field at a pulse repetition rate less than the spin rate. As the rotational speed or spin rate of the top decreases naturally because of drag, the top will couple to the pulsed magnetic field generated by the coil or coils at a spin rate of about 30 cps (1800 rpm) The spin rate is maintained at approximately 1.25 to 1.5 times the pulse rate.

The magnetic field which generates the horizontal field component at the spinning top is provided by a conductor wire wrapped about the base magnet with the axes of the windings oriented along any horizontal axis, or by a coil or coils disposed above or below the base magnet or in a central opening thereof or above the location of the spinning levitated top with the axis or axes of the field or fields generated thereby arranged along a horizontal axis or axes at any azimuthal angular orientation with respect to the local vertical.

As also described in the aforesaid U.S. Pat. No. 5,404,062 and U.S. patent application Ser. No. 08/413,949, adjustment of the weight of the spinning top is necessary to obtain the proper relationship of spinning top mass and the interacting magnetic fields of the base and top so that levitation of the top can be maintained for a reasonable period of time. The weight adjustment is accomplished by adding or removing washers of different weights to the top spindle and securing them in place with a rubber grommet or O-ring.

SUMMARY OF THE INVENTION

The present invention is directed to further improvements in the aforesaid methods and apparatus for extending the duration of levitation of a rotationally stabilized magnetic levitation device, such as the levitated spinning top disclosed in U.S. Pat. No. 5,404,062 and U.S. patent application Ser. No. 08/413,949, from its normal duration of several minutes to durations of many hours, or essentially indefinitely using a horizontal magnetic field. Although the present invention may have other applications not specifically described herein, an important object of the invention is to increase the educational, recreational and commercial capabilities and uses of the aforesaid rotationally stabilized magnetic levitation devices and to extend their utility to many fields of endeavor.

According to the present invention, a flat base magnet is magnetized such that the field lines of its magnetic field are substantially perpendicular to the flat surfaces of the base magnet and the magnet of the spinning top is magnetized such that the field lines of its main magnetic field are substantially parallel to the spin axis of the spinning top. A horizontal component of a magnetic field is located in the region of the spinning top and is pulsed at a selected repetition rate of about 15–30 pulses per second (pps), or at multiples of the selected repetition rate, e.g., 20 pps or 40 pps.

The pulsed magnetic field is preferably achieved by locating one or more conductive wire coils in an appropriate position or positions with respect to the magnet of the spinning top so that when a pulsed dc voltage is applied to the coil a pulsed horizontal field is generated at the spinning top. The pulsed magnetic field may be applied before or after the top is spun either manually or by any other means.

To operate the system, the spinning top is subjected to the horizontal component of the pulsed magnetic field at a pulse repetition rate less than the spin rate. As the rotational speed or spin rate of the top decreases naturally because of drag, the top will couple to the pulsed magnetic field generated by the coil or coils. It has been found that the spin rate typically does not couple to the pulse rate at a ratio of 1:1 or 1:2. For instance, in the aforementioned LEVITRON® levitation system, at a pulse repetition rate of about 21–24 pps for the pulsed magnetic field (or a multiple thereof, e.g., 42–48 pps), the spinning top will couple to the field at a spin rate of about 30 cps (1800 rpm) and will spin at substantially that rate indefinitely or for an extended period of time. It has also been found that coupling does not appear to be possible if the pulse rate of the magnetic field is greater than the rate at which coupling occurs for a given spin rate of the top unless the pulse rate is a multiple of the coupling pulse rate. In other words, the pulsed field does not appear to be capable of increasing the spin rate of the top to achieve coupling so that coupling appears to occur only when the spin rate of the top decreases to that spin rate required for coupling at a given pulse rate or a multiple of the coupling pulse rate. Once coupled, however, it is possible to increase the spin rate of the top by slowly increasing the pulse rate up to the maximum spin rate of the top.

The above-described phenomenon is believed to occur for the following reason. The magnet of the spinning top attempts to align itself with the horizontal component of the induced magnetic field of the coil each time the field is energized, i.e., pulsed. This attempted alignment produces a net force or torque on the spinning top about its spin axis when the spin rate of the top is coupled or synchronized with the pulsed induced magnetic field. The ratio between the pulse rate and the spin rate when the top is coupled to the pulsed field varies both with the pulse rate and the strength of the horizontal field at the top. Typically, it has been found that the spin rate is approximately 1.25 to 1.5 times the lowest coupling pulse rate. Of course, in the case of a multiple of the lowest coupling pulse rate, the spin rate will be a lower percentage of the pulse rate, e.g., about 0.6 to 0.75 times the first multiple of the lowest coupling pulse rate. The foregoing explanation of the general theory of operation of the present invention is not intended to limit the scope of the invention or the claims except to the extent that it may be expressly set forth in one or more claims herein.

The magnetic field which generates the horizontal field component at the spinning top may be provided in a number of ways. For example, a conductor wire may be wrapped about the base magnet with the axes of the windings oriented along any horizontal axis. Alternatively, a coil or coils may be disposed above or below the base magnet or in a central opening thereof (if such opening is provided in the base magnet) or above the location of the spinning levitated top with the axis or axes of the field or fields generated thereby arranged along a horizontal axis or axes at any angular orientation with respect to the local vertical.

In another embodiment of the invention, the coil is provided with an iron core which is preferably in the form of a flat sheet material with a rectangular perimeter. The coil is preferably wrapped about the core sheet so as to have a relatively flattened shape rather than a cylindrical shape. Advantageously, such coil/core configuration minimizes the height of the core/coil arrangement and makes possible a compact combination with the base magnet. It has been found that the iron core substantially improves the horizontal orientation of the pulsed magnetic field at the spinning top. The coil may be wrapped about the rectangular core sheet substantially at a central portion thereof, but is preferably wrapped about the core from end-to-end so as to substantially enclose the core sheet in the wire coil. This latter form of core/coil structure provides a further improvement in the horizontal orientation of the pulsed magnetic field than a coil located about the central portion of the core sheet.

Other arrangements of one or more coils or coil/core combinations for achieving the required horizontal magnetic field component at or in proximity to the horizontal plane of the magnet of the spinning levitated top will be apparent to those of ordinary skill in the art in view of the description herein. The coil (or coils as the case may be) is periodically energized or pulsed by applying a dc current pulse to the coil at a given pulse repetition rate, e.g., 15 pps, or a low frequency ac current, e.g., 15–20 Hertz.

To place the system of the invention into operation according to the method of the invention, the top is levitated above the base in the manner described in U.S. Pat. No. 5,404,062 or U.S. patent application Ser. No. 08/413,949. The coil or coil/core combination may or may not be energized with a pulsed voltage at the time of levitation although it is preferred that the coil or coil/core is so energized. Assuming the coil or coil/core is energized prior to spinning the top, and depending on the preset pulse repetition rate and the initial spin rate imparted to the top manually or by other means, the spin rate of the top will decrease until it couples to the pulse rate of the horizontal magnetic field and reaches a substantially constant spin rate for that pulse rate. Thereafter, the top will spin substantially indefinitely unless influenced by other disturbances, such as, for example, large temperature variations, interfering magnetic fields, mechanical disturbances or the like.

It has also been discovered according to a further improvement of the invention that the stability and continuity of the levitation of the spin-stabilized top can be maintained more consistently when the washer or washers which are mounted on the top spindle for weight adjustment are loosely mounted on the spindle so as to permit relative rotation and radial movement therebetween. Preferably, the central bore of each washer is slightly larger in diameter than the diameter of the spindle on which it is mounted. In addition, the rubber grommet which is used to retain the washer(s) in place is not tightly secured against the washer(s), but is spaced slightly from the washer(s) so as to permit the desired rotation and radial movement of the washer(s) relative to the spindle.

The improved stability and continuity of the levitation using loosely mounted washers is believed to occur through the following mechanisms. In the absence of the pulsed horizontal field the spinning top responds only to the nearly vertical field of the base magnet, executing small nutational and precessional motions. The washers used to weight the top appropriately for levitation rest on the surface of the spinning magnet, rotating smoothly with it. Each pulse of the horizontal field creates a brief, strong torque acting perpendicular to the magnetic axis of the top, causing a sudden increase of the nutational and precessional kinetic energy of the top and of the weights as well. This energy is partially converted to spin kinetic energy of the top if the weights are loose and thus free to move around the spindle.

The foregoing discussion of the present understanding of operation of the loose washers is not intended to limit the scope of the invention or the claims except to the extent that it may be expressly set forth in one or more claims herein.

With the foregoing and other objects, advantages and features of the invention that will become hereinafter apparent, the nature of the invention may be more clearly understood by reference to the following detailed description of the invention and to the several views illustrated in the drawings.

BRIEF DESCRIPTION OF THE DRAWINGS

FIG. 1 is a side elevation view of one embodiment of an electromagnetic drive system of the present invention for a magnetic levitation system of the type disclosed in U.S. Pat. No. 5,404,062 or U.S. patent application Ser. No. 08/413,949;

FIG. 1A schematically shows two types of waveform pulses that may be applied to the electromagnetic drive system of the invention;

FIG. 2 is a side elevation view of another embodiment of the electromagnetic drive system of the present invention;

FIG. 3 is a side elevation view of still another embodiment of the electromagnetic drive system of the invention;

DETAILED DESCRIPTION OF THE INVENTION

Figure 4:
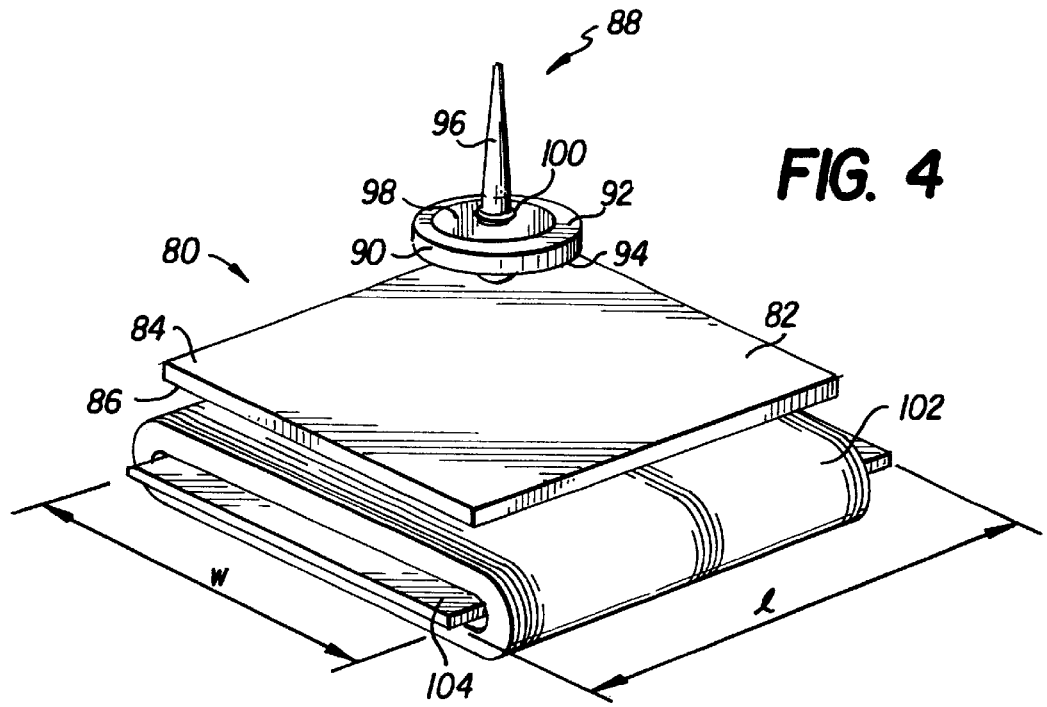
FIG. 4 is a perspective view of another embodiment of the electromagnetic drive system of the present invention with a flattened coil wrapped about an iron core sheet.

The following description refers to the use of the invention in maintaining the rotation of the magnetic top of U.S. Pat. No. 5,404,062 or U.S. patent application Ser. No. 08/413,949, once the top has been set spinning and levitating above a base magnet. The process of spinning and levitating the top can be summarized as follows with reference to FIG. 1 wherein the entire system has been designated generally by reference numeral 10. System 10 comprises a base magnet 12 which may have a polygonal, square or circular periphery and a central circular opening (not shown). The magnet 12 has planar upper and lower surfaces 14, 16, respectively, and is polarized or magnetized perpendicular to those surfaces. A top 18 comprises a disk magnet or a flat ring magnet 20 polarized or magnetized oppositely to base magnet 12 perpendicular to its upper and lower surfaces 22, 24, respectively. A nonmagnetic spindle 26 passes through a central opening (not shown) in the ring magnet 20 and is used to manually spin the top about a vertical axis. It is to be understood that the top may be spun by means other than manually. If the magnet 20 is a disk, the spindle may be attached to the surface of the magnet along the axis thereof.

According to the present invention, a horizontal component of a magnetic field illustrated by magnetic flux lines H is generated by a coil 30 of conductive wire wrapped around the base magnet 12. Coil 30 has terminals 32, 34 to which a voltage may be applied. When a pulsed dc voltage V, e.g., a square wave or haversine wave, as shown in FIG. 1A, for example (or a low frequency ac current) is applied to terminals 32, 34, a pulsed magnetic field is generated along the axis A of the coil 30. That field has a horizontal component at the region of the ring magnet 20 as partially represented by flux lines H. The spin rate of the processing spinning top 18 will decrease because of drag which will eventually cause the top to couple to the pulsed horizontal component H of the magnetic field. Thereafter, the pulsed field will maintain the top spinning indefinitely or for an extended period of time at a substantially constant spin rate so long as the pulsed field is applied.

FIG. 2 illustrates another embodiment of the system of the invention designated generally by reference numeral 40. In system 40 a base magnet 42 is used to levitate a spinning top 44. A large diameter coil 46 (shown partly broken) is disposed with its central axis B in a horizontal plane at or near the levitating height of the spinning top 44. Coil 46 has terminals 48, 50 to which a pulsed dc voltage V (or an ac current) may be applied to generate a pulsed magnetic field represented partially by flux lines F. Field F has a horizontal component at the top 44 which maintains the top spinning indefinitely or for an extended period of time at a substantially constant speed as described above.

FIG. 3 illustrates yet another embodiment of the system of the invention represented generally by reference numeral 60. System 60 includes a base magnet 62 which is used to levitate spinning top 64. A coil 66 is disposed above the top 64 with its axis C in a horizontal plane. Coil 66 has terminals 68, 70 to which a pulsed dc voltage V may be applied to generate a pulsed magnetic field represented by flux lines G. Field F has a horizontal component at the top 64 which maintains the top spinning indefinitely or for an extended period of time at a substantially constant speed in the manner described above.

The pulsed dc voltage may be provided in all the embodiments of the invention by means of a dc voltage, such as provided, for example, by a 9-volt transistor battery, connected to a conventional pulse generator/amplifier circuit well known to those of skill in the art. A conventional ac current generator may also be used to provide the pulsed magnetic field. It has been found that the shape of the pulsed dc voltage waveform or the ac current waveform is not critical to the operation of the invention.

FIG. 4 illustrates yet another embodiment of the invention comprising a continuously levitating spinning magnet system designated generally by reference numeral 80. System 80 comprises a base magnet 82 which may have a square or circular periphery and a central circular opening (not shown). The magnet 82 has planar upper and lower surfaces 84, 86, respectively, and is polarized or magnetized perpendicular to those surfaces. A top 88 comprises a flat ring magnet 90 polarized or magnetized oppositely to base magnet 82 perpendicular to its upper and lower surfaces 92, 94, respectively. A nonmagnetic spindle 96 passes through a central opening (not shown) in the ring magnet 90 and is used to manually spin the top about a vertical axis. A washer 98 is mounted over the spindle 96 and held in place by a rubber grommet or O-ring 100. The washer 98 is provided for adjusting the weight of the top which has been found necessary to achieve optimum conditions for levitation as described in more detail in U.S. Pat. No. 5,404,062 and U.S. patent application Ser. No. 08/413,949, the subject matter of which is incorporated herein by reference.

Beneath the base magnet 82, and in substantially coplanar relation thereto, there is disposed a coil 102 with a ferrous metal core 104, preferably in the form of a square or rectangular sheet of iron, although other perimetrical shapes are possible. The coil 102 has an oblong or substantially flattened shape as compared with the cylindrical coil 46 shown in FIG. 2 and may be formed by wrapping the coil wire or winding about the width w of core 104 from side to side. It has been found that it is advantageous for the coil 102 to extend substantially the entire length l of the core 104 from end to end. It is believed that such arrangement or structure of the coil/core combination improves the horizontal orientation and magnitude of the pulsed magnetic field at the location of the spinning magnet 88 and thus the levitation performance of the system. In addition, the substantially flattened shape of the coil minimizes the vertical height needed to accommodate the system of FIG. 4.

Other coil or coil/core arrangements may be used to generate the required pulsed horizontal field at the spinning top. Such arrangements will be apparent to one of ordinary skill in the art in light of the description herein. It will also be apparent in view of this description that the angular orientation or azimuth of the axis of the horizontal field at the spinning magnet is not critical and may be selected at random. In other words, the axis of the coil/core combination of FIG. 4, for example, may be oriented at any azimuth angle about the vertical axis of the spinning top. Furthermore, it is also contemplated within the scope of the present invention that the pulsed horizontal field at the spinning magnet need not be pulsed with a voltage between a zero magnitude and a positive or negative voltage magnitude, but may be pulsed with voltages of two different strengths of positive or negative voltage.

The magnitude and pulse width of the voltage to be applied to the coil which generates the horizontal field will vary depending on a number of factors, such as coil location, number of turns, wire size, the particular designs and sizes of the base magnet and the ring magnet of the top, whether or not a core is used with the coil and other factors. It has been found that adjustment of the voltage magnitude and pulse width to achieve indefinite levitation of the spinning top is relatively easy to accomplish in light of the teachings herein.

Figure 5:
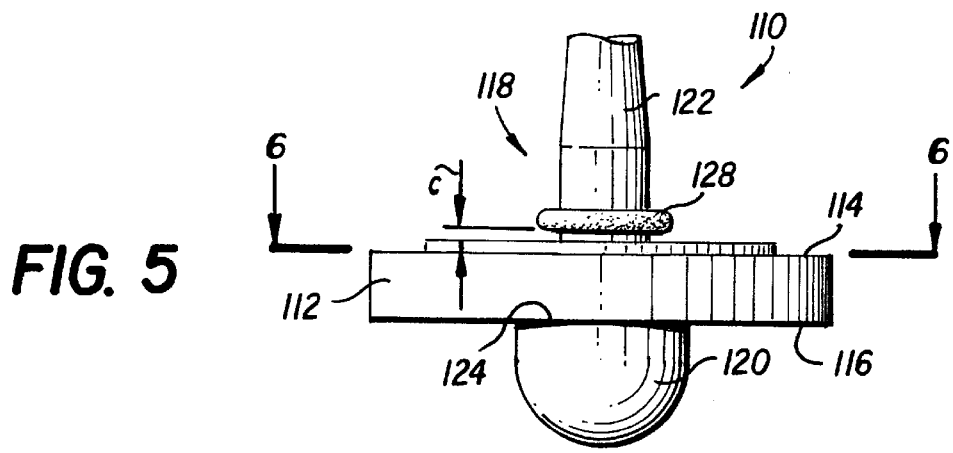
FIG. 5 is a side elevation view of a spin-stabilized top of the invention illustrating the positioning of a washer on the spindle and its securing grommet.
Figure 6:
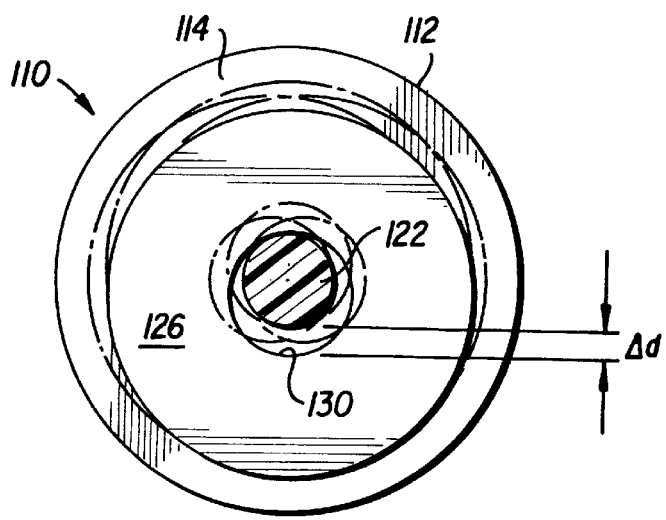
FIG. 6 is top plan view of the top of FIG. 5 taken along line 6—6 of FIG. 5 showing the relationship between the diameters of the spindle and the washer.

Referring now to FIGS. 5 and 6, there is illustrated a spinning top 110 similar to the spinning tops 18 and 88 described above. Top 110 is formed with a flat ring or disk magnet 112 with upper and lower planar surfaces 114, 116, respectively. A non-magnetic spindle 118 passes through the central opening in the ring magnet and is secured therein by any suitable means, e.g., adhesive, interference fit, etc. As can be seen from FIG. 5, the lower portion 120 of the spindle 118 has a larger diameter than the upper portion 122 thereof so as to form a shoulder 124 upon which the ring magnet 112 rests. This structure is one of many possible arrangements for supporting the magnet on the spindle. In the case of a disk magnet, the spindle portions 120, 122 may be bonded to the surfaces of the magnet along the spin axis thereof.

As previously described, a washer 126 is placed on the spindle 118 to adjust the weight of the top 110 for optimum levitation performance and is held in place by a rubber grommet or O-ring 128, or other suitable means. The washer 126 is made of a non-magnetic material, such as brass, copper, a non-magnetic stainless steel alloy or other non-magnetic material. As best seen in FIG. 6, the central bore 130 of the washer 126 is somewhat larger in diameter than the diameter of the upper portion 122 of the spindle 118 about which the washer is located. The difference in diameters is depicted in FIG. 6 as dimension Ad which is not necessarily to scale. In FIG. 5, the washer 126 is shown held in place on the spindle 118 by the O-ring 128, but with a sufficient clearance c so that the O-ring does not prevent the washer from rotating and moving radially relative to the spindle portion 122 and magnet 112.

It has been surprisingly found that the above-described arrangement or structure of the washer, spindle and O-ring components of the spinning top substantially improves the stability and thus the longevity of levitation of the spinning top when used in combination with one of the pulsed magnetic fields described herein. It has been observed stroboscopically that the washer 126 rotates slightly faster than the spinning top and that the washer slides radially in a "wobbling" or "orbiting" fashion about the spindle 118 as depicted illustratively in broken lines in FIG. 6. The wobbling motion of the washer has also been accompanied by a "chattering" sound emitted by reason of the washer motion. When the O-ring 128 is pushed down tightly onto the washer so as to eliminate the clearance c and prevent the wobbling movement of the washer about the spindle, the stability of the spinning top decreases.

The reasons for improvement of the stability and longevity of levitation using the above arrangement are not understood. However, one arrangement using a known LEVITRON® spinning top and washer with the following specifications has been shown to provide virtually continuous levitation with a pulsed magnetic field provided by the coil arrangement shown, for example, in FIG. 4.

| | |
|---|---|
| Spinning top weight: | 14.5 gms. (without washer) |
| Washer weight: | 3.0 gms. |
| Spindle diameter (at washer location): | 6.32 mm. |
| Washer ID: | 6.70 mm. |

It is to be understood, however, that the above weights and dimensions describe a non-limiting example of the invention.

It has also been found that a particularly advantageous magnetic material for the magnets of the present invention is a neodymium-iron-boron (Nd—Fe—B) magnet of the type described, for example, in U.S. Pat. No. 5,213,703, the disclosure of which is incorporated herein by reference.

One of many possible applications of the present invention is a spinning top in the form of a globe or a planet, such as the earth, in which the globe is levitated at a constant spin rate over a hidden base magnet and a strobe light is used to illuminate the spinning globe at a frequency slightly less than the constant rotation rate of the globe. The effect of this arrangement is the appearance of a globe rotating at a relatively slow revolution rate. Several strobe lights will substantially enhance the effect. Other spinning objects may also be displayed in the foregoing manner, e.g., a ballerina or any other spinning animate or inanimate object one may desire to observe levitating with a slow apparent rotation or with no apparent rotation.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. A system for magnetically levitating an object for an extended period of time, comprising:

a first base magnet having a first magnetic field;

a second magnet having a second magnetic field and a spin axis;

a spindle for rotating said second magnet about the spin axis at a frequency of rotation such that when said second magnet is rotated above said first base magnet, said second magnet levitates over said first base magnet;

a washer loosely mounted on the spindle so as to be freely rotatable with respect thereto;

means for generating a third magnetic field having a magnetic field component at the second magnet; and means for pulsing said third magnetic field at a selected pulse frequency independently of the frequency of rotation of said second magnet, that is, with no input to said pulsing means derived from the frequency of rotation of said second magnet, and such that the rotating second magnet has a frequency of rotation greater than the lowest coupling pulse frequency of the third magnetic field.

2. The system of claim 1, wherein said means for generating said third magnetic field comprises at least one coil.

3. The system of claim 2, wherein said coil is disposed about said first base magnet.

4. The system of claim 2, wherein said coil is disposed above said first base magnet and said second levitating magnet.

5. The system of claim 2, wherein said coil is disposed about said first base magnet and said second levitating magnet, said coil having an axis substantially at the location of the second levitating magnet.

6. The system of claim 2, wherein said coil is disposed below said first base magnet and said second levitating magnet.

7. The system of claim 6, wherein said coil is flattened and including a sheet material core in said flattened coil.

8. The system of claim 7, wherein said core is a ferrous metal core with a length and width, said coil being wound about the width of said core over substantially the entire length thereof.

9. The system of claim 2, wherein said pulsing means comprises a pulsed dc voltage source applied to said at least one coil.

10. The system of claim 9, wherein said voltage source is a square wave or haversine wave.

11. The system of claim 2, wherein said pulsing means comprises an ac current source applied to said at least one coil.

12. The system of claim 1, wherein the magnetic field component of the third magnetic field is a horizontal component.

13. A method of magnetically levitating an object for an extended period of time, comprising the steps of:

providing a first base magnet having a first magnetic field and a second magnet having a second magnetic field and a spindle for spinning the second magnet about a spin axis;

placing a washer in loosely fitting relation about said spindle so as to permit relative rotation between said washer and said spindle;

rotating said second magnet over said first base magnet at a frequency of rotation to magnetically levitate the second magnet at a location over the second magnet;

generating a third magnetic field having a magnetic field component at the location of the second magnet; and pulsing said third magnetic field at a selected pulse frequency independently of the frequency of rotation of said second magnet, that is, with no input to said pulsing means derived from the frequency of rotation of said second magnet, and such that the rotating second magnet has a frequency of rotation greater than the lowest coupling pulse frequency of the third magnetic field to maintain the rotation and levitation of said second magnet for an extended period of time.

14. The method of claim 13, wherein said step of generating a third magnetic field comprises providing at least one coil adjacent said magnets and applying a pulsed dc voltage to said coil.

15. The method of claim 13, wherein said pulsed dc voltage has a square wave or a haversine wave shape.

16. The method of claim 13, including the step of increasing the pulse frequency of the third magnetic field to increase the frequency of rotation of the rotating second magnet.

17. A magnetic levitation system for levitating an object for an extended period of time, comprising:
   a first magnet having a first axis and a substantially planar first surface, said first magnet being magnetized normal to said first surface and parallel to said first axis such that said first surface has a first polar orientation;
   a second magnet having a second axis and a second surface, said second magnet being magnetized normal to said second surface and parallel to said second axis such that said second surface has the same polar orientation as the first surface of the first magnet, said second magnet having a spindle;
   a washer loosely disposed about said spindle so as to be rotatable and radially movable relative thereto;
   means for rotating said second magnet about the second axis whereby when said second magnet is rotated and disposed above said first magnet with the first and second surfaces in confronting relation, said second magnet levitates at a location over said first magnet; and
   means for applying a component of a pulsed magnetic field at the location of levitation of the second magnet such that the rotating second magnet has a frequency of rotation greater than the lowest coupling pulse frequency of the pulsed magnetic field and the pulsed magnetic field is pulsed at a selected pulse frequency independently of the frequency of rotation of said second magnet, that is, with no input to said pulsing means derived from the frequency of rotation of said second magnet to maintain the rotation and levitation of the second magnet for an extended period of time.

18. The system of claim 17, wherein said means for applying a component of a pulsed magnetic field comprises at least one coil, said coil being arranged to produce a horizontal magnetic field component at the location of levitation of the second magnet.

19. The system of claim 18, including a pulsed dc voltage source or an ac current source applied to said at least one coil.

20. The system of claim 19, wherein said dc voltage source has a square wave or a haversine wave shape.

21. The system of claim 17, wherein the component of the pulsed magnetic field has a horizontal magnetic field component.

22. The system of claim 17, wherein said means for applying a component of a pulsed magnetic field comprises at least one coil, said coil being arranged below said first magnet to produce a horizontal field component at the location of levitation of the second magnet.

23. The system of claim 22, wherein said coil is flattened and including a sheet material core in said flattened coil.

24. The system of claim 23, wherein said core is a ferrous metal core with a length and width, said coil being wound about the width of said core over substantially the entire length thereof.

25. The system of claim 1, wherein said first and second magnets are made of a neodymium-iron-boron magnet material.

26. The system of claim 17, wherein said first and second magnets are made of a neodymium-iron-boron magnet material.

27. The system of claim 1, wherein said washer is made of a non-magnetic material.

28. The system of claim 17, wherein said washer is made of a non-magnetic material.

29. A system for magnetically levitating an object for an extended period of time, comprising:
   a first base magnet having a first magnetic field;
   a second magnet having a second magnetic field and a spin axis;
   a spindle for rotating said second magnet about the spin axis at a frequency of rotation such that when said second magnet is rotated above said first base magnet, said second magnet levitates over said first base magnet;
   a washer loosely mounted on the spindle so as to be radially movable with respect thereto;
   means for generating a third magnetic field having a horizontal magnetic field component at the second magnet, said generating means including an oblong coil and a ferrous sheet material core; and
   means for pulsing said third magnetic field at a selected pulse frequency independently of the frequency of rotation of said second magnet, that is, with no input to said pulsing means derived from the frequency of rotation of said second magnet, and such that the rotating second magnet has a frequency of rotation greater than the lowest coupling pulse frequency of the third magnetic field.

30. The system of claim 29, wherein said core has a length and width, said coil being wound about the width of said core over substantially the entire length thereof.

31. The system of claim 30, wherein said sheet material core has a rectangular perimeter.

32. A system for magnetically levitating an object for an extended period of time, comprising:
   a first base magnet having a first magnetic field;
   a second magnet having a spindle, a second magnetic field and a spin axis;
   means for rotating said second magnet about the spin axis at a frequency of rotation such that when said second magnet is rotated above said first base magnet, said second magnet levitates over said first base magnet;
   a washer loosely mounted on the spindle so as to be radially movable with respect thereto;
   means for generating a third magnetic field having a magnetic field component at the second magnet; and
   means for pulsing said third magnetic field at a selected pulse frequency independently of the frequency of rotation of said second magnet, that is, with no input to said pulsing means derived from the frequency of rotation of said second magnet, and such that the rotating second magnet has a frequency of rotation greater than the lowest coupling pulse frequency of the third magnetic field.

33. The system of claim 32, wherein said means for generating said third magnetic field comprises at least one coil.

34. The system of claim 33, wherein said coil is disposed below said first base magnet and said second levitating magnet.

35. The system of claim 33, wherein said pulsing means comprises a pulsed dc voltage source applied to said at least one coil.

36. The system of claim 34, wherein the component of the third magnetic field is a horizontal component.

37. A method of magnetically levitating an object for an extended period of time, comprising the steps of:

provoking a first base magnet having a first magnetic field and a second magnet having a spindle, a second magnetic field and a spin axis;

placing a washer in loosely fitting relation about said spindle so as to permit relative rotation between said washer and said spindle;

rotating said second magnet over said first base magnet at a frequency of rotation to magnetically levitate the second magnet at a location over the second magnet;

generating a third magnetic field at the location of the second magnet; and pulsing said third magnetic field at a selected pulse frequency independently of the frequency of rotation of said second magnet, that is, with no input to said pulsing means derived from the frequency of rotation of said second magnet, and such that the rotating second magnet has a frequency of rotation greater than the lowest coupling pulse frequency of the third magnetic field to maintain the rotation and levitation of said second magnet for an extended period of time.

38. The method of claim 37, wherein said step of generating a third magnetic field comprises providing at least one coil adjacent said magnets and applying a pulsed dc voltage or an alternating current to said coil.

39. A system for magnetically levitating an object for an extended period of time, comprising:

a first base magnet having a first magnetic field;

a second magnet having a second magnetic field and a spin axis;

means for rotating said second magnet about the spin axis at a frequency of rotation such that when said second magnet is rotated above said first base magnet, said second magnet levitates over said first base magnet;

a spindle attached to said second magnet;

a washer loosely mounted on the spindle so as to be radially movable with respect thereto;

means for generating a third magnetic field having a magnetic field component at the second magnet; and means for pulsing said third magnetic field at a selected pulse frequency independently of the frequency of rotation of said second magnet, that is, with no input to said pulsing means derived from the frequency of rotation of said second magnet, and such that the rotating second magnet has a frequency of rotation greater than the lowest coupling pulse frequency of the third magnetic field.

\* \* \* \* \*